United States Patent [19]
Altmann et al.

[11] Patent Number: 6,118,804
[45] Date of Patent: Sep. 12, 2000

[54] LASER AMPLIFICATION SYSTEM

[75] Inventors: Konrad Altmann; Thorsteinn Halldorsson, both of Munich, Germany

[73] Assignees: DaimlerChrysler AG, Stuttgart; Micro Systems Design Dr. Altmann GmbH, Munich, both of Germany

[21] Appl. No.: 09/068,156

[22] PCT Filed: Oct. 30, 1996

[86] PCT No.: PCT/EP96/04704

§ 371 Date: May 4, 1998

§ 102(e) Date: May 4, 1998

[87] PCT Pub. No.: WO97/17747

PCT Pub. Date: May 15, 1997

[30] Foreign Application Priority Data

Nov. 3, 1995 [DE] Germany .......................... 195 41 020

[51] Int. Cl.[7] .................................................. H01S 3/091
[52] U.S. Cl. .............................. 372/75; 372/101; 372/43
[58] Field of Search .................................. 372/92, 94, 95, 372/96, 98, 99, 101, 103, 107, 75

[56] References Cited

U.S. PATENT DOCUMENTS

| | | |
|---|---|---|
| 3,891,945 | 6/1975 | Schlossberg ........................... 331/94.5 |
| 5,097,477 | 3/1992 | Scheps . | |
| 5,131,002 | 7/1992 | Mooradian . | |
| 5,148,441 | 9/1992 | Itai . | |
| 5,181,223 | 1/1993 | Baer ........................................... 372/69 |
| 5,206,874 | 4/1993 | Opower ..................................... 372/72 |
| 5,237,584 | 8/1993 | Shannon et al. . | |

FOREIGN PATENT DOCUMENTS

| | | |
|---|---|---|
| 0 310 241 | 4/1989 | European Pat. Off. . |
| 0 632 551 | 1/1995 | European Pat. Off. . |

Primary Examiner—Frank G. Font
Assistant Examiner—Gioacchino Inzirillo
Attorney, Agent, or Firm—Evenson, McKewon, Edwards & Lenahan, PLLC

[57] ABSTRACT

A laser amplification system with a lasant solid-state material is pumped by pumped light sources and in the case of which one or several pumped beams are guided by mirrors or other optical aids such that each individual pumped beam is focussed several times on different points of the solid-state material, the latter being present in the form of a cohesive or separate solid body which is designed such that the pumped beam is absorbed only in the focal regions, whereby the latter are optically pumped, and in that the laser beam is deflected and guided such that it irradiates all these focal points and is amplified in this manner. This provides a laser amplification system in which the system characteristics are optimized simultaneously, which, in addition, permits a compact construction and is designed such that it is suitable for mass production at reasonable cost.

27 Claims, 6 Drawing Sheets

LASER AMPLIFICATION SYSTEM

BACKGROUND AND SUMMARY OF THE INVENTION

The invention relates to a laser amplification system having one or more solid bodies made of laser-active materials which are arranged in a radiation field, and which are optically pumped by means of pumped light sources, laser diodes being preferably used as the pumped light sources.

Various embodiments of laser systems of the above-mentioned type are known. These systems are usually formed by utilizing an optical cavity or resonator as lasers. In this case, to attempt to meet the respective requirements, specifically a good overlapping between the pumped beam and the laser beam, an efficient cooling of the lasant material and a high beaming quality, different arrangements are provided. However, usually the simultaneous optimizing of all system characteristics, which is important for such a system, is not achieved. Thus, a laser is known, for example, from U.S. Pat. Nos. 4,785,459 and 4,837,771 in the case of which the beam is reflected back and forth in a zigzag-shape between the boundary surfaces of a crystal block. Laser diode arrays are arranged in each case at the impinging points of the beam, by which laser diode arrays the material is optically pumped. Although this results in a good overlapping of the pumped beam and the laser beam, it impairs the optimal cooling of the pumped points.

Furthermore, a laser amplification system is known from European Patent Application 0 632 551 A1 in the case of which the pumped beam is guided several times to the center point of a small plate made of a lasant material which has a small thickness relative to the diameter in order to carry-off the formed heat as fast as possible and to therefore minimize the temperature of the small plate. However, the latter objective is only achieved in this manner to a limited degree because, in the case of this arrangement, the whole pumping output is absorbed in a very small volume range which, corresponding to the product of the surface of the focal point and the thickness of the small plate, typically has a size of from 0.1 $mm^3$ to 0.5 $mm^3$.

It is an object of the present invention to avoid the above-mentioned problems and to provide a laser amplification system in which the above-described system characteristics are optimized simultaneously and which, in addition, permits a compact construction and is designed such that it is suitable for mass production at reasonable cost.

This object is achieved according to the present invention, by a laser amplification system having a lasant solid-state material which is pumped by pumped light sources. One or more pumped beams is guided via mirrors or other optical aids such that each individual pumped beam is focussed several times on different points of the solid-state material, the latter being present in the form of a cohesive or separate solid body which are designed such that the pumped beam is absorbed only in the focal region whereby the latter are optically pumped. The laser beam is deflected and guided such that it irradiates through all these focal regions and is amplified in this manner. Advantageous further developments are described herein.

Other objects, advantages and novel features of the present invention will become apparent from the following detailed description of the invention when considered in conjunction with the accompanying drawings.

DETAILED DESCRIPTION OF THE DRAWINGS

Figure 1:
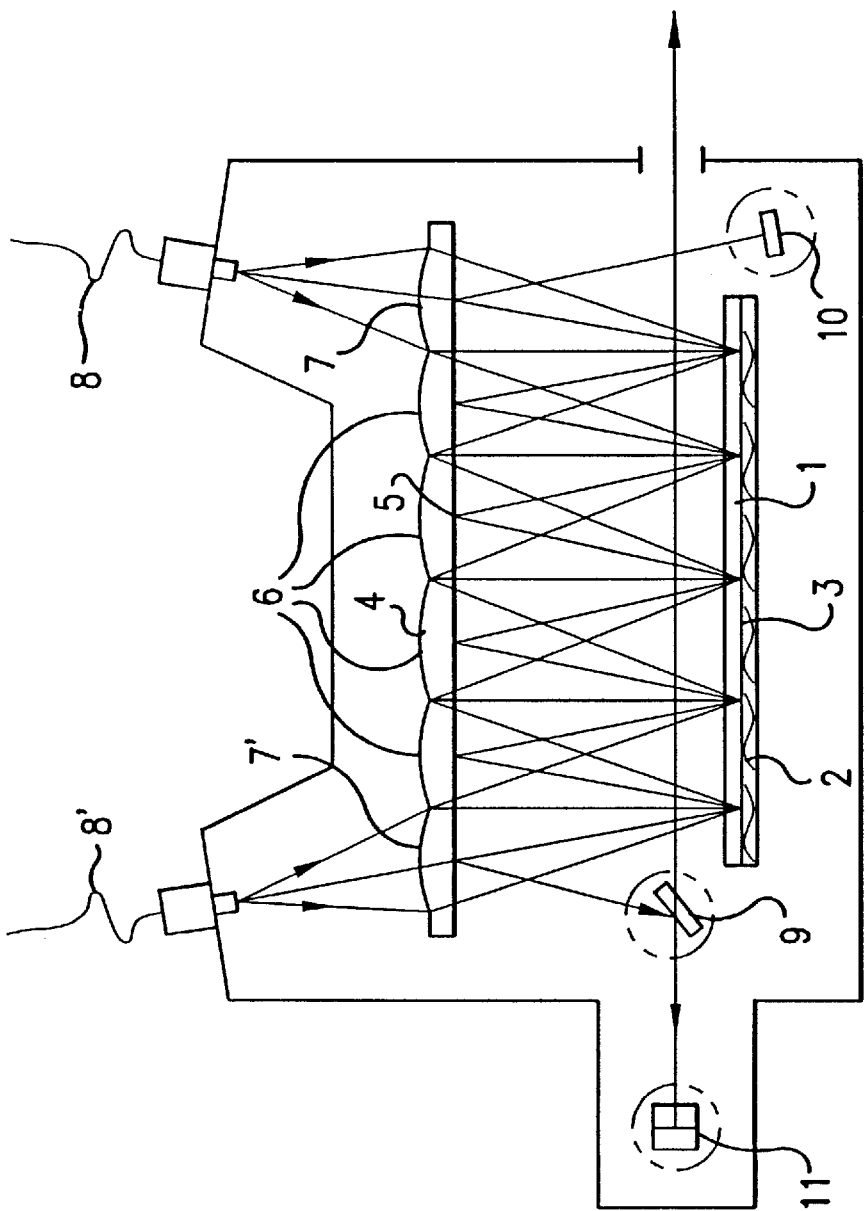
FIG. 1 is a schematic diagram of an embodiment of a laser amplification system according to the present invention.

The basic idea of the invention will be explained in the following through the use of the embodiment outlined in FIG. 1. A plane-parallel plate 1 made of a lasant material, which is suitable, for example, for the operation of a 3-level or a 4-level laser and, depending in each case on the doping and the coefficient of thermal conduction, has a thickness of 0.1 to 1 mm, a width of 1 to 5 mm, and a length of 5 to 20 mm, is cooled on the underside by a flowing medium 2. On the underside 3, the plate is coated to be highly reflecting for the laser radiation as well as for the pumped radiation, but on the top side it is coated to be antireflecting for both types of radiation. At a distance of approximately 1–30 mm above this plate, an optical element 4 is situated which is made of a material which is transparent to the pumped radiation and has a refractive index which is higher than that of the surrounding medium (in the present example, air). The lower boundary surface 5 of this element is flat and is coated such that it is highly transparent to the pumped radiation, while the upper boundary surface consists of astigmatically spherical surfaces 6 which are arranged in series side-by-side. Of these surfaces 6, the extreme right surface 7 and the extreme left surface 7' are highly transparent, but the others are highly reflecting for the pumped radiation. The astigmatically spherical surfaces 7, 7' therefore form two lenses with the surface 5. By means of these lenses, the pumped beams emerging from the waveguides 8, 8' are focussed on the plate 1, the center beam forming an angle with the plate 1 which corresponds to approximately half the angle of the beam emerging from the waveguide. Then the pumped beams are reflected on the underside 3 of the plate 1 and are directed to the spherical surfaces 6 which are the closest from the right and from the left. These act as concave mirrors and focus the pumped beams again on points of the plate which are situated farther on the inside from the right and the left and whose distance from the two first focal regions is determined by the impinging angle and the spacing of the surfaces 3 and 5. From there, the pumped beams are again directed against surfaces 6 situated farther on the inside and so on. In this manner, the pumped beams are reflected back and forth in a zigzag-shape between the concave mirrors 6 and the surface 3, in which case the pumped beam is gradually absorbed in the plate 1 whose thickness is selected such that this absorption takes place only in the focal regions of the pumped radiation. In order to direct the laser beam through these focal regions, it is also reflected back and forth in a zigzag-shape but between the surfaces 3 and 5. In order to achieve the latter, the surface 5 is coated in the area of the impinging points of the laser beam to be highly reflective for the latter. In the areas which are situated opposite the focal regions of the pumped radiation, however, the surface 5 is transmitting for the laser radiation in order to avoid a lasing of parasitic modes.

If the numerical aperture NA and thus also the beam angle of the pumped beams emerging from the waveguides 8, 8' is large (such that an unsuitably flat zigzag course of the laser mode would be obtained), it is suggested to fill in the area between the plate 1 and the surface 5 with a block consisting of the same material as the plate 1 but being undoped and therefore not lasant. As a result, it is achieved that the NA of the pumped beam is reduced in the mentioned area by a factor according to Abbe's sine condition, which factor corresponds to the refractive index of the material. In the case of Nd:YAG, this can, for example, reduce the angle of the pumped beam by a factor of 1.82 which permits a significantly steeper course of the zigzag mode. By means of this measure, it is also achieved that the construction is monolithic and is therefore significantly less sensitive to maladjustments.

A further development of the above-described laser amplification system consists of completing this system to form a laser by adding the cavity end mirrors 9 and 10.

An additional further development of the system consists of introducing one or more non-linear optical elements 11 or other optical function elements into the beam path for the purpose of a frequency doubling or tripling.

Figure 2:
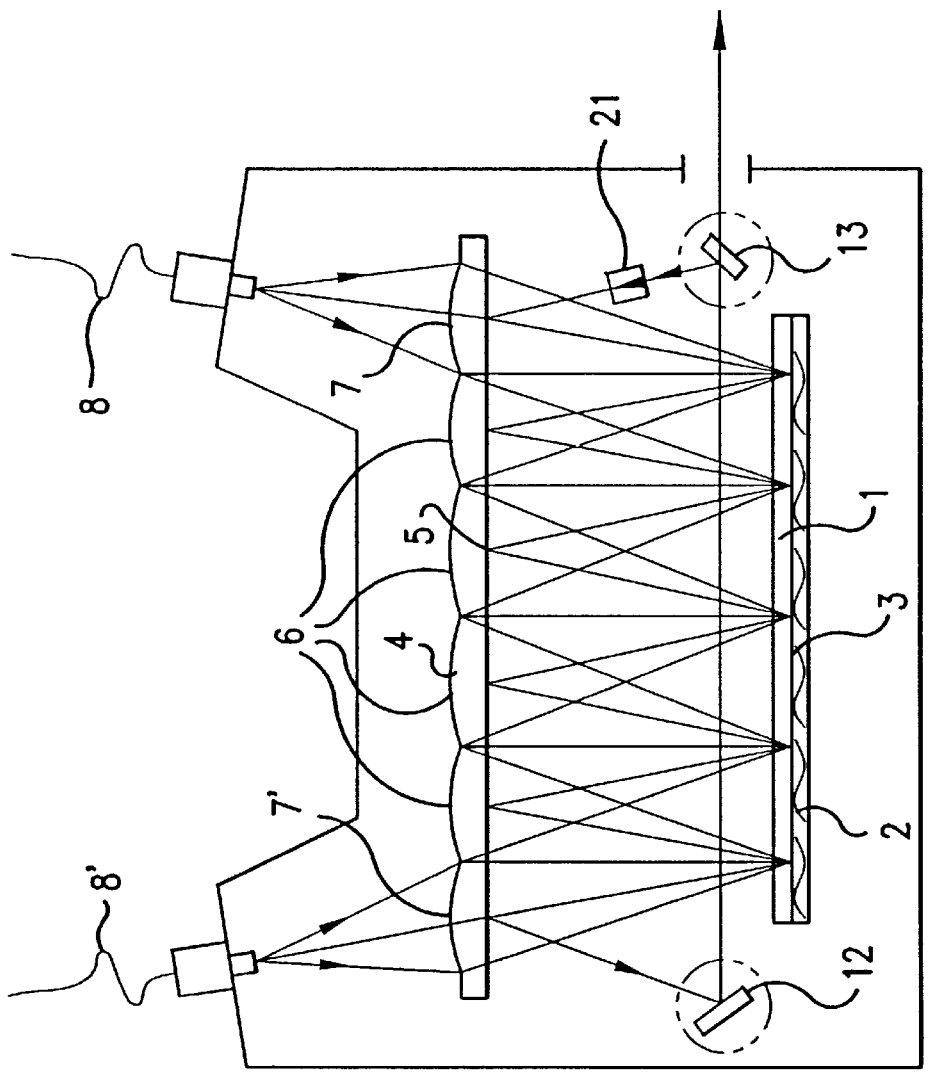
FIG. 2 is a schematic diagram of a laser amplification system according to the present invention.

FIG. 2 is a diagrammatic view of an embodiment in which the laser amplification system is supplemented by mirrors 12 and 13 such that a ring cavity is created. It is an advantage of this arrangement that the so-called "spatial hole burning" is avoided which occurs in the case of a cavity with end mirrors. The element 21 represents an optical diode.

Figure 3:
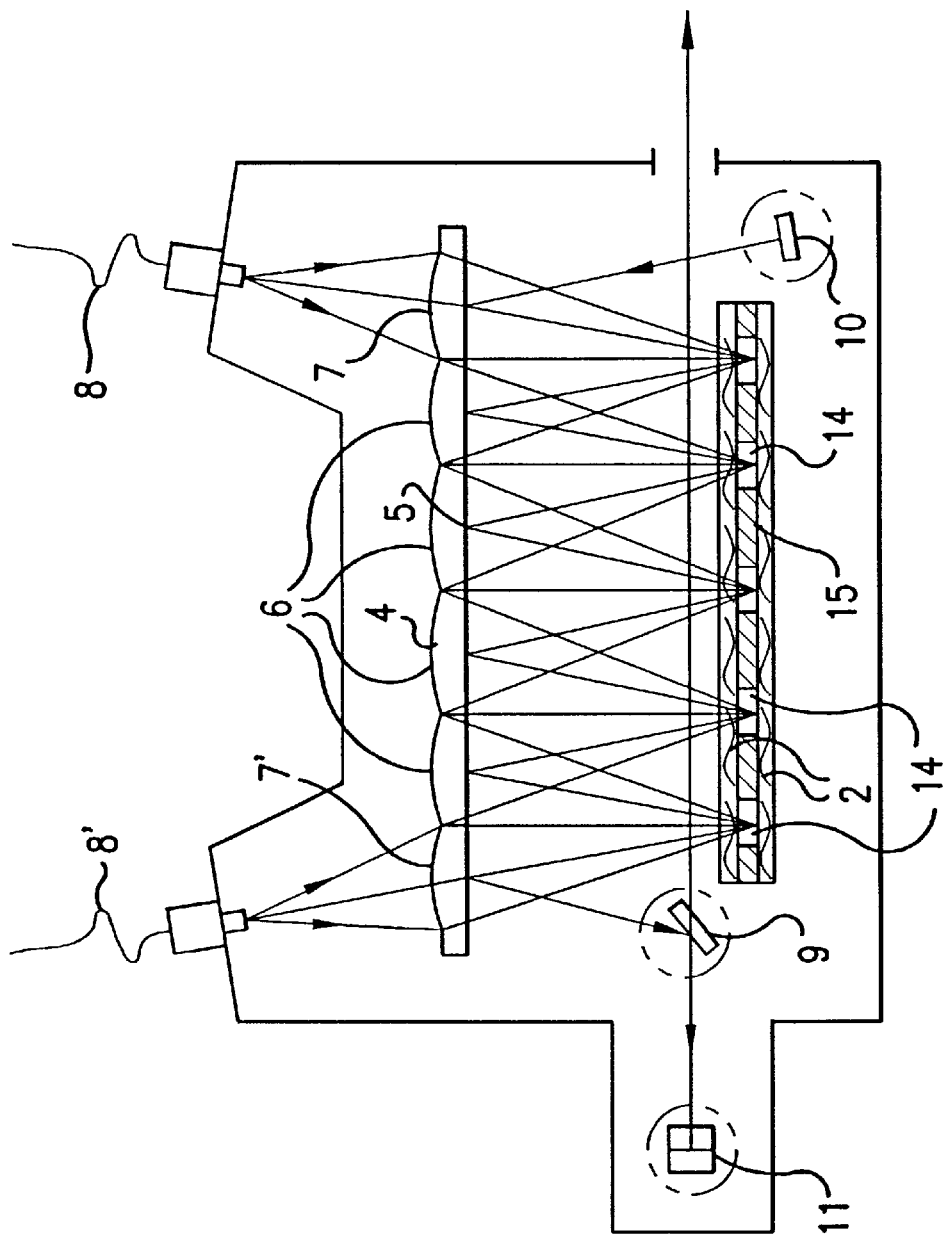
FIG. 3 is a schematic diagram of an embodiment of a laser amplification system according to the present invention.

FIG. 3 is a diagrammatic view of an embodiment in which the plate 1 is divided into individual small plates 14 which are held by a carrier plate 15. The latter is preferably made of a high thermally conductive material for also cooling the lateral surfaces of the small plates. It is an advantage of this arrangement that a smaller amount of the more expensive lasant material is required. In addition, a greater optical homogeneity can be ensured when the small plates are manufactured.

As an additional further development, it is possible for the lasant material to be cooled as a function of its thermal conductivity also on the top side, as illustrated in FIG. 3.

Figure 4:
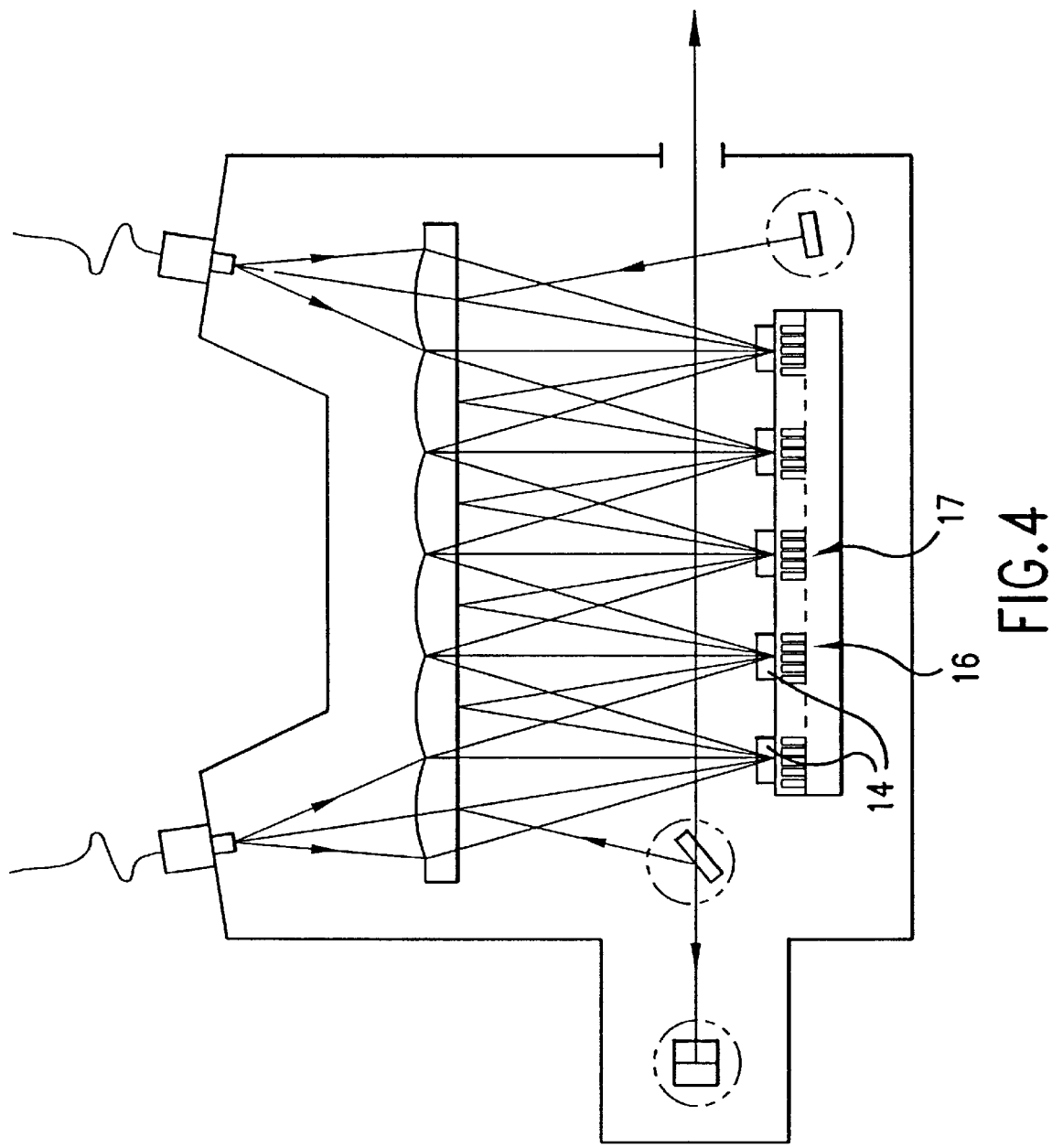
FIG. 4 is a schematic diagram of another embodiment of a laser amplification system according to the present invention.

It is also possible to simplify the system as a function of the properties of the material such that there is no direct liquid cooling of the lasant material. FIG. 4 is the schematic view of an embodiment in the case of which the small plates 14 are mounted on the underside in heat-conducting contact with a carrier plate 16 through which cooling ducts 17 pass.

By means of the arrangement according to the invention it is achieved, on the one hand, that the lasant material can be kept thin and the carrying-off of heat can take place directly at the absorption points of the pumped beam almost over the whole surface of the plate 1 or the small plates 14. Simultaneously, it is avoided that the absorption of the whole pumping output takes place in a cohesive volume range which is therefore difficult to cool, as is the case with conventional frontally pumped laser systems. The latter also applies to the above-mentioned European Patent application 0 632 551 A1, although here the absorption takes place within a very small volume range.

In practice, in the case of the arrangement of the invention, the temperature gradient and therefore also the temperature in the small plates is lowered by a factor which corresponds to the number of the irradiated focal regions in comparison to the European Patent application 0 632 551 A1. This is of a decisive importance for the efficiency of the output conversion particularly in the case of 3-level or quasi-3-level lasers since here the lower laser output is thermally occupied. In addition, the arrangement of the reflection mirrors in one row can be technically implemented and adjusted more easily than their spatial arrangement as used, for example, in FIG. 28 of the European Patent application 0 632 551 A1. The thermal lens effect of the lasant material is intentionally not eliminated, as occurs explicitly in the main claim and in the specification, Section 3, of the European Patent application 0 632 551 A1 because of the requirement that the laser beaming field propagate almost in parallel to the temperature gradient. In contrast, it is provided to adapt the thermal lens and its focussing effect on the laser beam and its diameter induced in the plate 1 or in the small plates 14 by the pumped beaming, the thermal dispersion of the refractive index and the thermal deformation such that an optimal overlapping between the pumped beam and the laser beam or the transversal basic mode of the cavity is achieved within the focal regions. This adaptation is achieved by the selection of the thickness and of the coefficient of absorption of the plate or the small plates which, in the case of the present arrangement, permits a very fine adaptation.

The use of the thermal lens effect has the advantage that the surfaces 3 and 5 between which the laser beam is reflected back and forth can be constructed in an exactly flat manner which significantly reduces the adjustment expenditures. Should the focussing effect of the thermal lenses not be sufficient for certain laser materials, it is suggested that these be intensified by the use of convex instead of plane cavity mirrors 9 and 10 or 12 and 13. Should a further bundling of the laser beam be necessary, the reflection surfaces 3 and 5 in the area of the impinging points of the laser beam can be curved in a suitable manner in order to exercise an additional focussing effect on the laser beam in this fashion.

Figure 5:
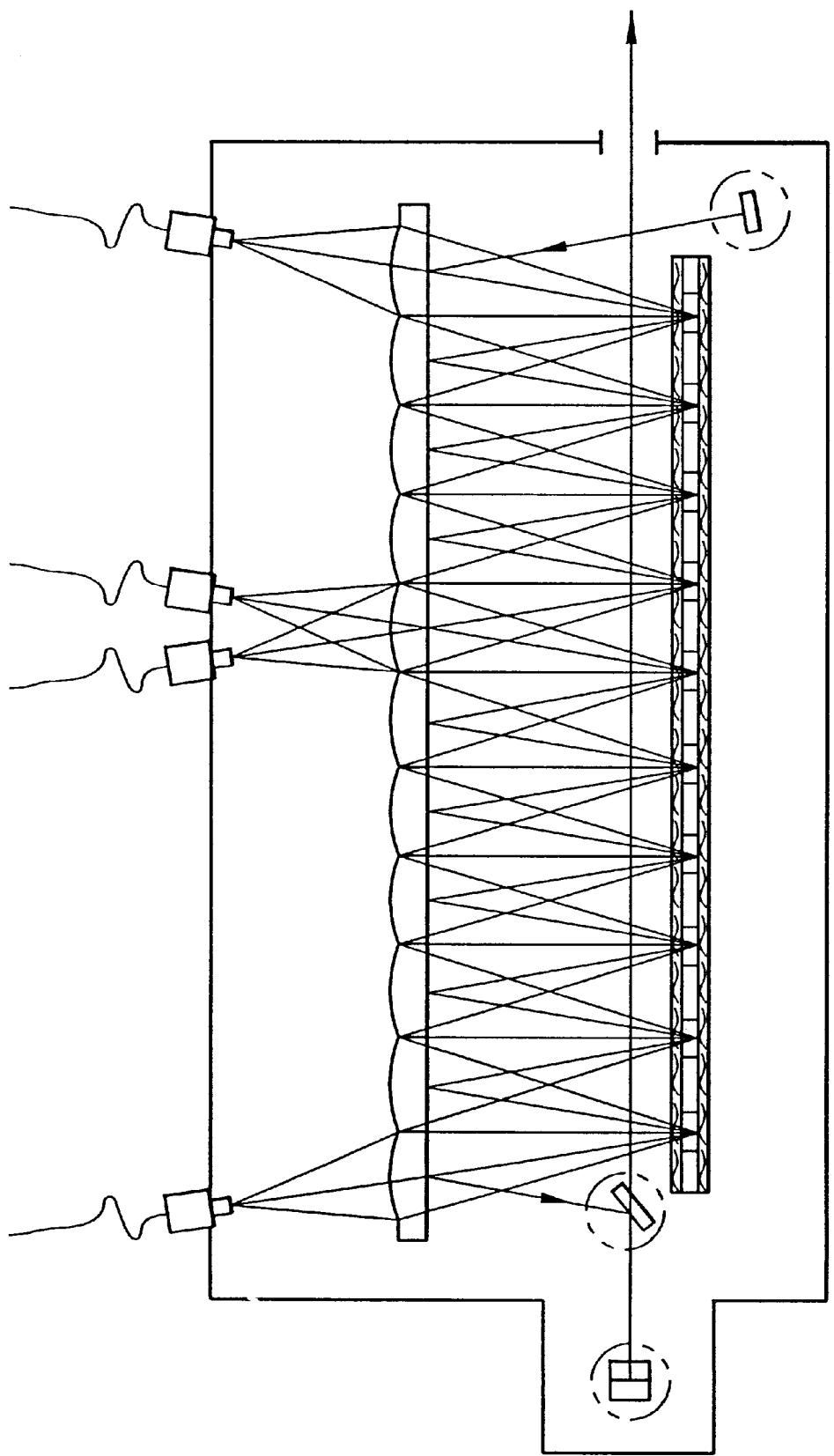
FIG. 5 is a view of an arrangement in which two laser amplification systems constructed corresponding to FIG. 1 are coupled.

FIG. 5 shows an arrangement in which two laser amplification systems constructed according to FIG. 1 are coupled to form a laser with a frequency doubling. By means of the currently available laser diodes, the system is capable of supplying an output power of approximately 40 to 50 watt.

Figure 6:
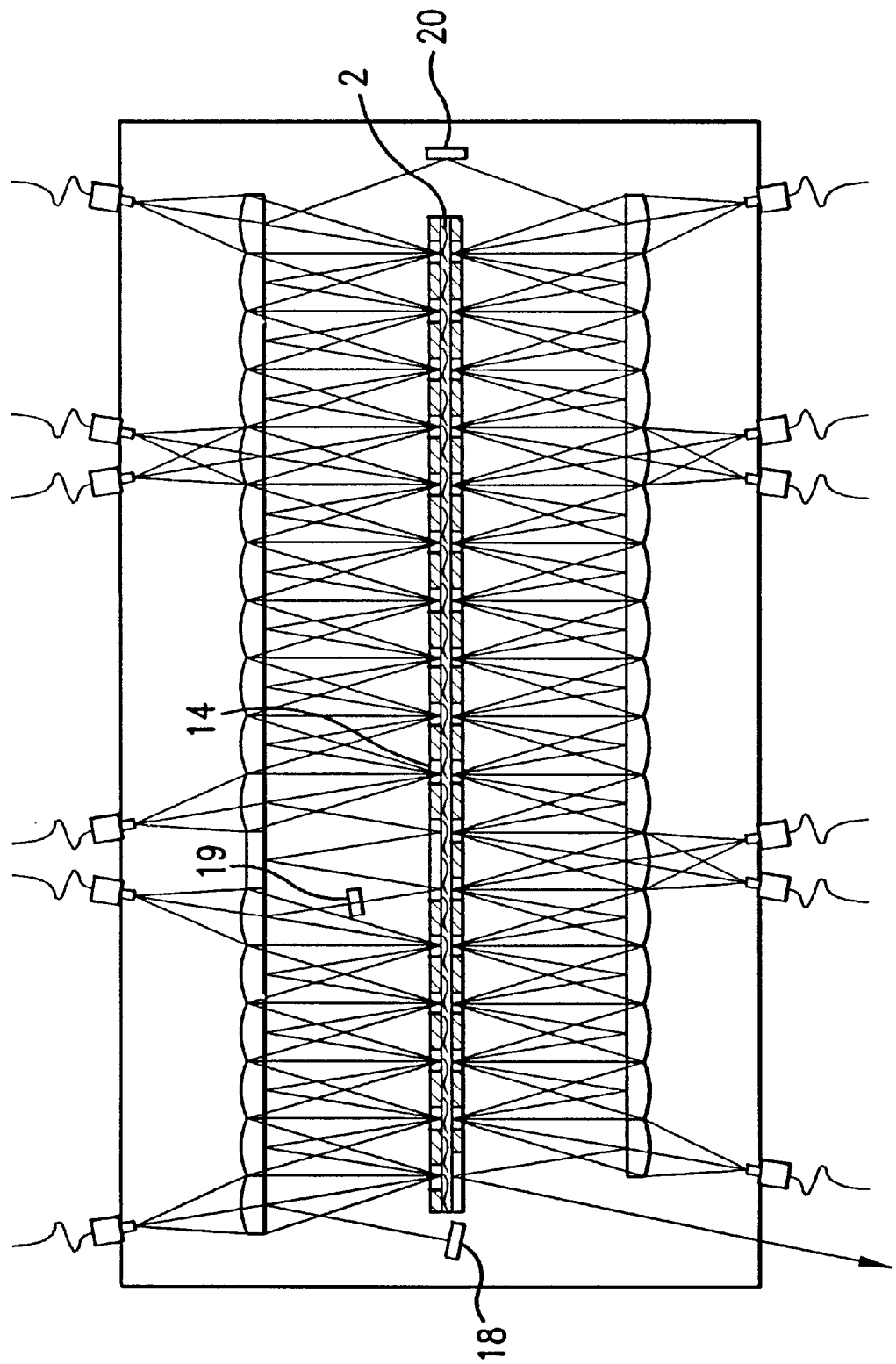
FIG. 6 is a view of an arrangement in which six laser amplification systems constructed corresponding to FIG. 1 are coupled, only the first being constructed as a laser, while the remaining systems amplify the beam emerging from the latter.

FIG. 6 shows an arrangement in which six of the above-described systems are coupled. Of these, the system on the top left is constructed as a laser by means of the mirrors 18 and 19; the other systems operate as laser amplifiers in that they amplify the beam coupled out by the mirror 19. This has the advantage that the adjustment expenditures of the arrangement are reduced since the beam does not pass several times through the whole arrangement as in the case of a cavity arrangement. The guiding of the beam emerging from the partial system operating as the laser takes place in the solid-state elements 14 by the induced thermal lenses and by the beam guiding effect by means of amplification (gain guiding effect). In this manner, the amplification systems connected behind operate similarly to folded lens waveguides, with the known beam-guiding properties. The number of amplification systems connected behind is therefore virtually unlimited. By means of the mirror-inverted arrangement of the amplification systems selected in FIG. 6, a joint cooling 2 of the lasant solid bodies is permitted. The upper and the lower amplification systems are coupled to one another by the deflection mirror 20. As an alternative, it is suggested to carry out the coupling by means of a waveguide. The latter is recommended when several units of combined subsystems are coupled to one another. It is expected that, by means of such an arrangement, 60–90% of the diode power can be converted into laser power. In the case of a coupling-on of 100 diodes, an output power of 1 kW should therefore be possible in the basic mode operation, in which case such an arrangement without the diode lasers could be housed in a volume of from 10 to 20 cm$^3$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laser amplification system, comprising:
    a lasant solid-state material which is pumped by pumped light sources;
    at least one optical element by which one or more pumped beams are guided such that each individual pumped beam is focussed several times on different regions of said solid-state material;
    wherein said solid-state material is a cohesive or separate solid body designed such that the individual pumped beam is absorbed only in focal regions and wherein the solid-state material is optically pumped; and
    further wherein a laser beam is deflected and guided such that it irradiates through all these focal regions in order to be amplified.

2. The laser amplification system according to claim 1, wherein each of said one or more pumped beams is focussed via one of concave mirrors and lenses, whose optical axes are arranged side-by-side in a plane, onto a reflecting surface which is arranged perpendicularly to said optical axes, an impinging angle being selected such that each individual pumped beam is reflected back and forth in a zigzag-shape between said concave mirrors and the reflecting surface and is absorbed by the lasant solid-state material situated in the focal regions.

3. The laser amplification system according to claim 1, wherein said laser beam is reflected back and forth in a zigzag-shape between two reflecting surfaces arranged in parallel.

4. The laser amplification system according to claim 1, wherein solid bodies forming said solid-state material include different materials.

5. The laser amplification system according to claim 1, wherein small plates or solid bodies made of a doped lasant material form the solid-state material and are adhered to a block made of an undoped laser material which is situated between the small plates or solid bodies and the optical elements.

6. The laser amplification system according to claim 1, further comprising a cooling system for the solid-state material by flowing a cooling medium on one or several boundary surfaces or by contacting the solid-state material with another solid body of a high thermal conductivity.

7. The laser amplification system according to claim 1, wherein individual solid bodies forming the solid state material have different thicknesses or are doped differently, with the purpose that, independently of the sequence at which the pumped beam absorbs through them, the latter absorb an identical amount of pumped radiation.

8. The laser amplification system according to claim 1, wherein thermal lenses, which are created in the regions into which the pumped light is focussed, are dimensioned such that they are suitable for a beam guiding which takes place by the selection of the thickness of the solid-state material, the intensity of the arriving pumped light, of the coefficient of absorption for the pumped light, or by the corresponding design of the cooling arrangement.

9. The laser amplification system according to claim 1, wherein said system is supplemented by end mirrors such that an optical cavity is created.

10. The laser amplification system according to claim 1, wherein the system is supplemented by mirrors such that a ring cavity is created.

11. The laser amplification system according to claim 1, wherein a material for a frequency doubling or tripling is introduced into the beam path.

12. The laser amplification system according to claim 1, wherein a feeding of the pumped light takes place by way of glass fibers.

13. The laser amplification system according to claim 1, further comprising at least one additional laser amplification system being optically switched together with said laser amplification system via mirrors or other optical aids.

14. The laser amplification system according to claim 2, wherein one boundary surface of said lasant solid-state material coincides with the reflecting surface.

15. The laser amplification system according to claim 2, wherein said laser beam is reflected back and forth in a zigzag-shape between two reflecting surfaces arranged in parallel.

16. The laser amplification system according to claim 3, wherein a second of said two reflecting surfaces for the laser beam is situated between a first reflecting surface and the optical element and wherein said second reflecting surface is highly transparent for the pumped light.

17. The laser amplification system according to claim 2, wherein pumped radiation emerging from fibers is focussed by said lenses on the reflecting surface, is reflected from this reflecting surface and is then focussed by said concave mirrors several times back onto the reflecting surface.

18. The laser amplification system according to claim 4, wherein individual ones of said solid bodies are positioned as small plates in or on a joint carrier plate.

19. The laser amplification system according to claim 6, wherein said focal regions of the pumped light directly adjoin cooled boundary surfaces.

20. The laser amplification system according to claim 8, wherein said thermal lenses are dimensioned such that only the transversal basic mode of the cavity lases.

21. The laser amplification system according to claim 13, wherein only one of the switched-together laser amplification systems is constructed as a laser while others intensify the beam emerging from this laser.

22. The laser amplification system according to claim 15, wherein one of the two reflecting surfaces for the laser beam is identical with said reflecting surface for the pumped beams.

23. The laser amplification system according to claim 15, wherein said concave mirrors and a second of said two reflecting surfaces are integrated into an optical structural member in that they form boundary surfaces of this optical structural member.

24. The laser amplification system according to claim 16, wherein said concave mirrors and a second of said two reflecting surfaces are integrated into an optical structural member in that they form boundary surfaces of this optical structural member.

25. The laser amplification system according to claim 16, wherein the second reflecting surface for the laser beam reflects the latter only in the regions which directly surround its impinging points, and in that particularly the regions which are situated perpendicularly opposite the focal regions with respect to the reflecting surface are transparent for the laser beam or absorb it in order to prevent a lasing of parasitic modes.

26. The laser amplification system according to claim 22, wherein a second of said two reflecting surfaces for the laser beam is situated between a first reflecting surface and the optical element and wherein said second reflecting surface is highly transparent for the pumped light.

27. The laser amplification system according to claim 22, wherein said concave mirrors and a second of said two reflecting surfaces are integrated into an optical structural member in that they form boundary surfaces of this optical structural member.

* * * * *